US011906256B2

(12) United States Patent
Satten

(10) Patent No.: US 11,906,256 B2
(45) Date of Patent: Feb. 20, 2024

(54) DIGITAL RECORDING OF FIREARM IDENTIFICATION

(71) Applicant: Darryl Satten, Huntington Beach, CA (US)

(72) Inventor: Darryl Satten, Huntington Beach, CA (US)

(*) Notice: Subject to any disclaimer, the term of this patent is extended or adjusted under 35 U.S.C. 154(b) by 58 days.

(21) Appl. No.: 17/808,024

(22) Filed: Jun. 21, 2022

(65) Prior Publication Data

US 2022/0412681 A1 Dec. 29, 2022

Related U.S. Application Data

(60) Provisional application No. 63/214,163, filed on Jun. 23, 2021.

(51) Int. Cl.
*F41A 5/26* (2006.01)
*F41A 17/06* (2006.01)
*G06F 3/06* (2006.01)
*F42B 5/02* (2006.01)

(52) U.S. Cl.
CPC ............ *F41A 17/06* (2013.01); *G06F 3/0604* (2013.01); *G06F 3/0655* (2013.01); *G06F 3/0679* (2013.01); *F41A 5/26* (2013.01); *F42B 5/02* (2013.01)

(58) Field of Classification Search
CPC ........................................................ F42B 5/26
USPC ................................................... 42/1.01, 430
See application file for complete search history.

(56) References Cited

U.S. PATENT DOCUMENTS

| | | | | |
|---|---|---|---|---|
| 4,150,624 A * | 4/1979 | Hammond | ............... | F42B 5/025 102/501 |
| 5,511,483 A * | 4/1996 | Griffin, Jr. | ............... | F42B 12/36 102/516 |
| 7,111,423 B2 * | 9/2006 | Lizotte | .................... | F41A 21/12 42/1.01 |
| 7,204,419 B2 * | 4/2007 | Lizotte | .................... | F42B 5/025 72/370.04 |
| 7,533,614 B1 * | 5/2009 | Reich | ....................... | F42B 5/025 102/430 |
| 7,823,495 B2 * | 11/2010 | Martini Filho | .......... | F42B 5/025 430/935 |
| 11,092,415 B2 * | 8/2021 | Blank | ................... | B23K 26/362 |
| 11,248,891 B2 * | 2/2022 | Koontz | ................. | F42B 30/006 |
| 2001/0011353 A1 | 8/2001 | Little et al. | | |
| 2006/0213105 A1 * | 9/2006 | Cugliari | ................ | F42B 12/625 102/501 |
| 2015/0074306 A1 | 3/2015 | Ayyagari et al. | | |
| 2017/0221115 A1 * | 8/2017 | Jarvis | .................... | G06Q 20/20 |

FOREIGN PATENT DOCUMENTS

WO WO-2004053422 A1 * 6/2004 ............ F41A 17/063

* cited by examiner

*Primary Examiner* — Reginald S Tillman, Jr.
(74) *Attorney, Agent, or Firm* — KOS IP Law LLP

(57) ABSTRACT

Digital Recording is provided using SWO technology wherein a microprocessor is located in a pistol and a single wire EEPROM is mounted on each cartridge used by the pistol. Power and data can be sent over a single wire from the microprocessor to the single wire EEPROM to communicate information about the pistol, such as the serial number, make, and model of the firearm.

13 Claims, 3 Drawing Sheets

DIGITAL RECORDING OF FIREARM IDENTIFICATION

CROSS REFERENCE TO RELATED APPLICATION

This is a regular utility application of provisional Ser. No. 63/214,163, filed Jun. 23, 2021.

FIELD OF ART

The present disclosure generally relates to guns and ammunition and specifically to a system and method involving the use of technology in pistols and ammunition for recording data or information onto spent shells fired from semi-automatic pistols.

BACKGROUND

Microscopic markings have been used for ballistics stamping. Markings can be engraved onto the tip of a firing pin and onto a breech face of a firearm with a laser or other means, such as etching. When the gun is fired, these etchings are transferred to the primer by the firing pin and to the cartridge case head by the breech face, using the pressure created when a round is fired. After being fired, shells released from the firing gun have microscopic markings imprinted on them that can then be examined by forensic ballistics experts to help trace the firearm to the last registered owner, at least in theory. However, microscopic markings recovered from spent shells have been less than optimal and have been known to be difficult to decipher by experts. Pursuant to California Gun Law AB 1471, the make, model, and serial number of the pistol are to be recorded onto the casings that have been fired and ejected by the pistol.

SUMMARY

Aspects of the invention include a combination pistol and cartridge comprising: a Single Wire Output (SWO) capable microprocessor located in the pistol; a single wire EEPROM; and wherein a single wire interface is provided when a part of the pistol contacts the single wire EEPROM located on the cartridge.

The part of the pistol that contacts the single wire EEPROM can be an extractor of the pistol.

The cartridge can be electrically grounded via contact with a metal barrel and slide.

The information can be written via the single wire interface when the extractor of the pistol contacts the single wire EEPROM.

The information can be written when the round is moved into the chamber of the pistol, before the round is fired.

The information can comprise a serial number of the firearm.

The information can further include the make and model of the firearm.

A method for manufacturing cartridges comprising the step of placing a substrate containing a single wire EEPROM onto a cartridge.

The method can comprise the step of placing a substrate containing a single wire EEPROM onto a second cartridge, onto a third cartridge, and onto a plurality of cartridges.

Aspect of the invention includes a cartridge having a single wire EEPROM mounted thereon. The cartridge can be understood as a round d of ammunition.

Aspects of the invention further include a cartridge comprising a bullet attached to a shell having an interior cavity containing gunpowder; and a substrate containing a single wire EEPROM mounted to an exterior of the shell.

A still further aspect of the invention includes a method of electronically microstamping a shell of a cartridge comprising: placing a SWO capable microprocessor in a frame or slide of a pistol; placing a substrate containing a single wire EEPROM onto the shell of the cartridge; forming a single wire interface between the SWO capable microprocessor and the cartridge; and communicating information from the SWO capable microprocessor to the single wire EEPROM.

The information transferred to the EEPROM can comprise a serial number of the pistol.

The information can further comprise a make and a model of the pistol.

The method can further comprise downloading additional data to the EEPROM.

The method wherein the additional data can comprise at least one of geographical location, time, and date that the cartridge is discharged.

BRIEF DESCRIPTION OF THE DRAWINGS

These and other features and advantages of the present devices, systems, and methods will become appreciated as the same becomes better understood with reference to the specification, claims and appended drawings wherein:

DETAILED DESCRIPTION

The detailed description set forth below in connection with the appended drawings is intended as a description of the presently preferred embodiments of a writing system for digitally recording information onto a casing of a round, said information relates to the pistol that ejected the casing after the round has been discharged. The writing system embodied with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Figure 1:
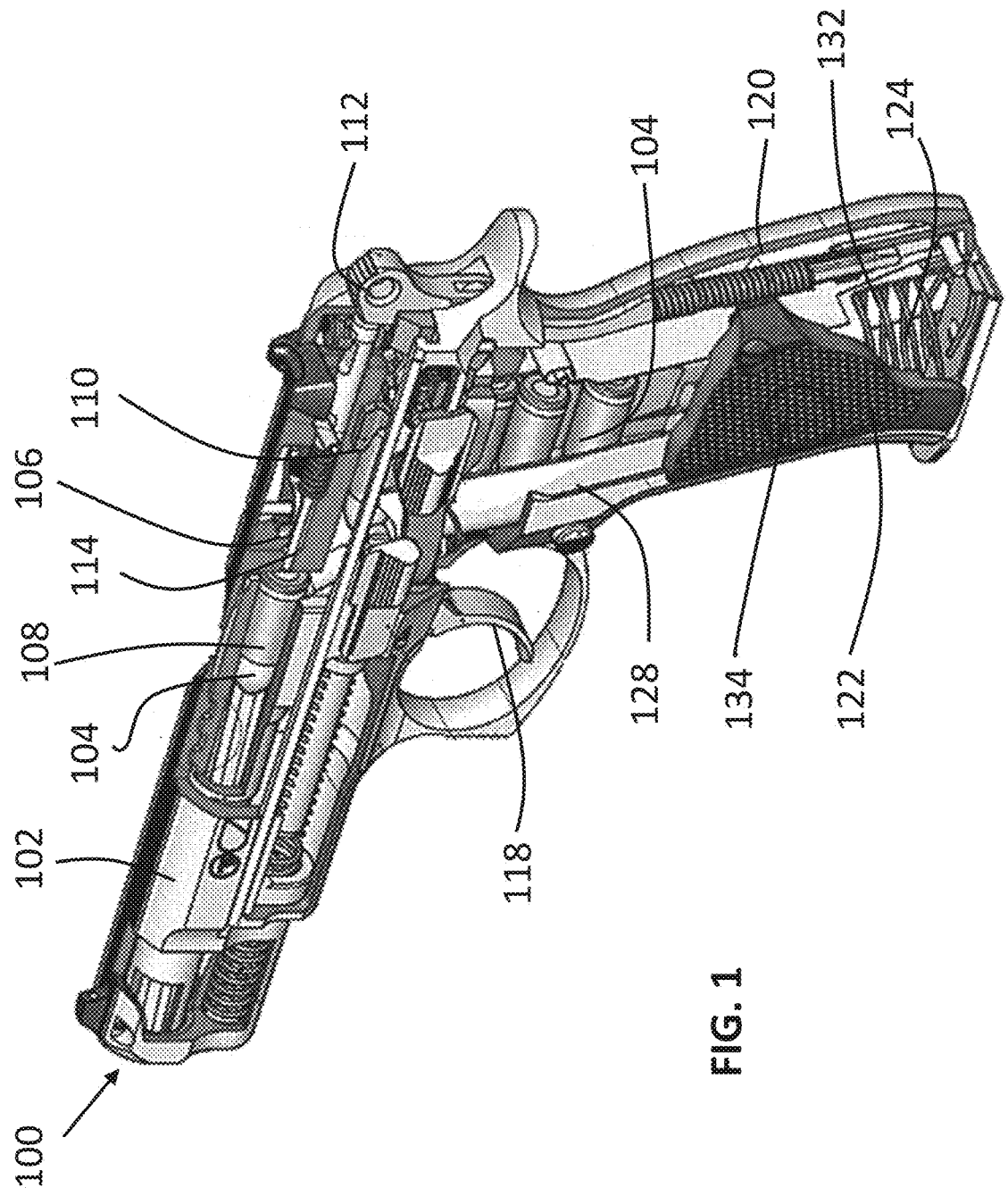
FIG. 1 a schematic perspective cutaway view of a semi-automatic pistol comprising a microprocessor.

With reference now to FIG. 1 a semi-automatic pistol 100 is shown in a partial cut-away perspective view to show various components of the pistol 100. As shown, the pistol 100 has a barrel 102, a round 104 loaded in the chamber to be fired on, an extractor 106 for gripping the extraction groove of the shell or casing 108, an ejector 110 that forces the retracted shell out of the ejection port of the gun, a hammer 112 for striking the firing pin 114 when the trigger 118 is pulled, and a handle 120 with a grip 122 and a magazine well 124. The magazine well can have a magazine body 128 located therein having a number of cartridges 104, also referred to as rounds or ammunition.

In an example, a microprocessor 134 is located in the frame or slide 102 of the pistol, such as sealed in the frame or the grip. The microprocessor 134 is shown in the schematic and can comprise a power source, such as a battery. In an example, the microprocessor is a 1-wire master device that provides serial signaling to a 1-wire slave such that power and data can be sent over a single wire. The 1-wire slave can be provided with each cartridge 104 located in the magazine. Communication between the 1-wire master and the 1-wire slave can be provided when the extractor 106 contacts the extractor groove of the casing.

To accommodate the use of only 1-wire, the signaling protocol combines clock, data, and power in a single wire and ground return. The 1-wire slave may derive power through the use of an internal capacitor, which can be charged while the line is in the idled high state. The uniqueness of 1-wire technology is that device power and communication can be carried over a single contact. Further information regarding one (1) wire technology and 1-wire protocol, including information regarding programming information to the processor for writing or transferring all or a subset of the information onto a substrate, such as an EEPROM, are disclosed in US Pub. No. 2015/0074306 to Ayyagari et al., No. US2013/0019039 to Herklots, and No. US2001/0030617 to Cusey, the contents of which are expressly incorporated herein by reference.

Additional information regarding 1-wire technology is available from Dallas Semiconductor Corp., which designed the 1-wire bus system utilized in 1-wire technology. Examples of microprocessors that utilize Serial Wire Output (SWO) are ARM Cortex microprocessors developed by STMicroelectronics.

In an example, an electronic writing system is provided for connecting with cartridges used in a pistol digital memory. A microprocessor for writing information, including the serial number, make, and model of the pistol that ejects the spent cartridge. SWO is implemented by a microprocessor. Memory can be placed on a dielectric substrate attached to a metallic cartridge at the ejector groove of the metallic cartridge. When a round or ammunition 104 is loaded into the chamber of the pistol, the casing makes contact with the extractor 106, which via one-wire protocol, writes information into or onto the EEPROM mounted with the casing of the ammunition, before the round is fired.

Electrical power needed to supply the microchip or microprocessor 134 can be a battery 132 located somewhere in the firearm such as the frame, grips, or magazine. The conductor carrying the data signal from the microprocessor embedded in the firearm to the cartridge can come across the extractor 106 that contacts the casing 108 (FIG. 2) of the cartridge 104 when the cartridge is loaded into the chamber before the round is fired. In some examples, if the read/write system of the present invention is interfered or tampered with by a user, the gun can be rendered to lock and not allow firing. For example, if the microchip 134 loses power, if the extractor is interfered with, and/or if non-approved cartridges are used without the dielectric substrates or EEPROMs, to name a few non-limiting examples, the system can cause the trigger to be locked and/or the hammer to be locked or disabled. Any number of actuated cylinders or drive mechanisms may be used to disable the gun in the event the electronic writing system is interfered or tampered with.

Figure 2:
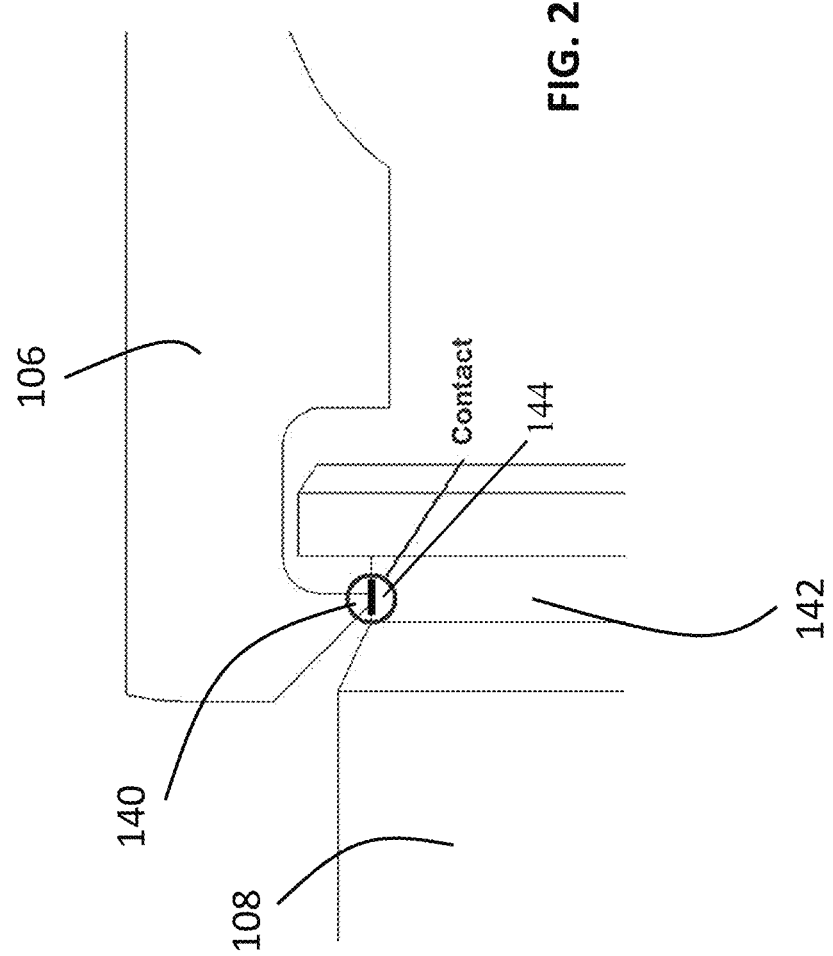
FIG. 2 is schematic view showing an extractor contacting a casing to provide one wire interface between the microprocessor located in the pistol and the memory located on the casing.

With reference now to FIG. 2, a schematic side view of an extractor 106 having a hook end 140 that grips the extraction groove 142 of a casing 108 of a cartridge is shown. Contact shown between the two can provide the single wire interface (SWI) needed to initiate data transmission from the microprocessor 134 on the pistol to the EEPROM 144 located on the shell or cartridge 108. The tip of the extractor 106 acts as an electrode for transmitting data from the microprocessor onto the EEPROM. In exemplary embodiments, the EEPROM 144 is located or mounted on a shell or cartridge 108 using adhesive, interference or pressed fitting the EEPROM in a corresponding slot or groove on the shell, securing the EEPROM to a ring or a band, such as high-temperature resistant non-metallic material, and gripping the shell exterior with the band. In an example, the microprocessor 134 (FIG. 1) for writing information onto the EEPROM 144 via the 1-wire protocol includes at least one of the serial number, make, and model of the pistol that ejects the spent cartridge. In some examples, the information includes at least two of or all the following information: the serial number, make, and the model of the pistol that ejects the spent cartridge.

Overall cost of implementation would include the non-recurring cost of the microprocessor built into the firearm and the electrode embedded in the extractor. Recurring cost would include the battery located somewhere within the firearm and the non-volatile memory attached to the ammo cartridge. Furthermore, old stock ammo can be easily modified by simply adding a band or ring of substrate containing the non-volatile memory. This method can be used on both rimmed and rimless ammo with 22-caliber being the best example of rimmed ammunition.

Methods of making and of using firearm electronic equivalent microstamping and components thereof are within the scope of the present invention. For example, aspects of the invention include a method of making of manufacturing pistols with SWO capable microprocessors and cartridges with one wire EEPROM. In some examples, the method comprises fitting existing ammunition with an elastic substrate having the single wire EEPROM placed around the exterior of the casing, at the extractor groove, for contact by the extractor.

RF technology is contemplated. For example, passive RFID tags can be placed onto each cartridge or ammo sold at a brick-and-mortar store. When a user purchases a supply of cartridges, the user must provide the seller with the make, model, and serial number of the pistol that the cartridges are intended to use with. The store worker can then write the information onto each of the RFID tags. If information on the cartridges match information on the gun, then the gun can fire. If information on the cartridges does not match information identifying the pistol, the gun can be electronically disabled.

Figure 3:
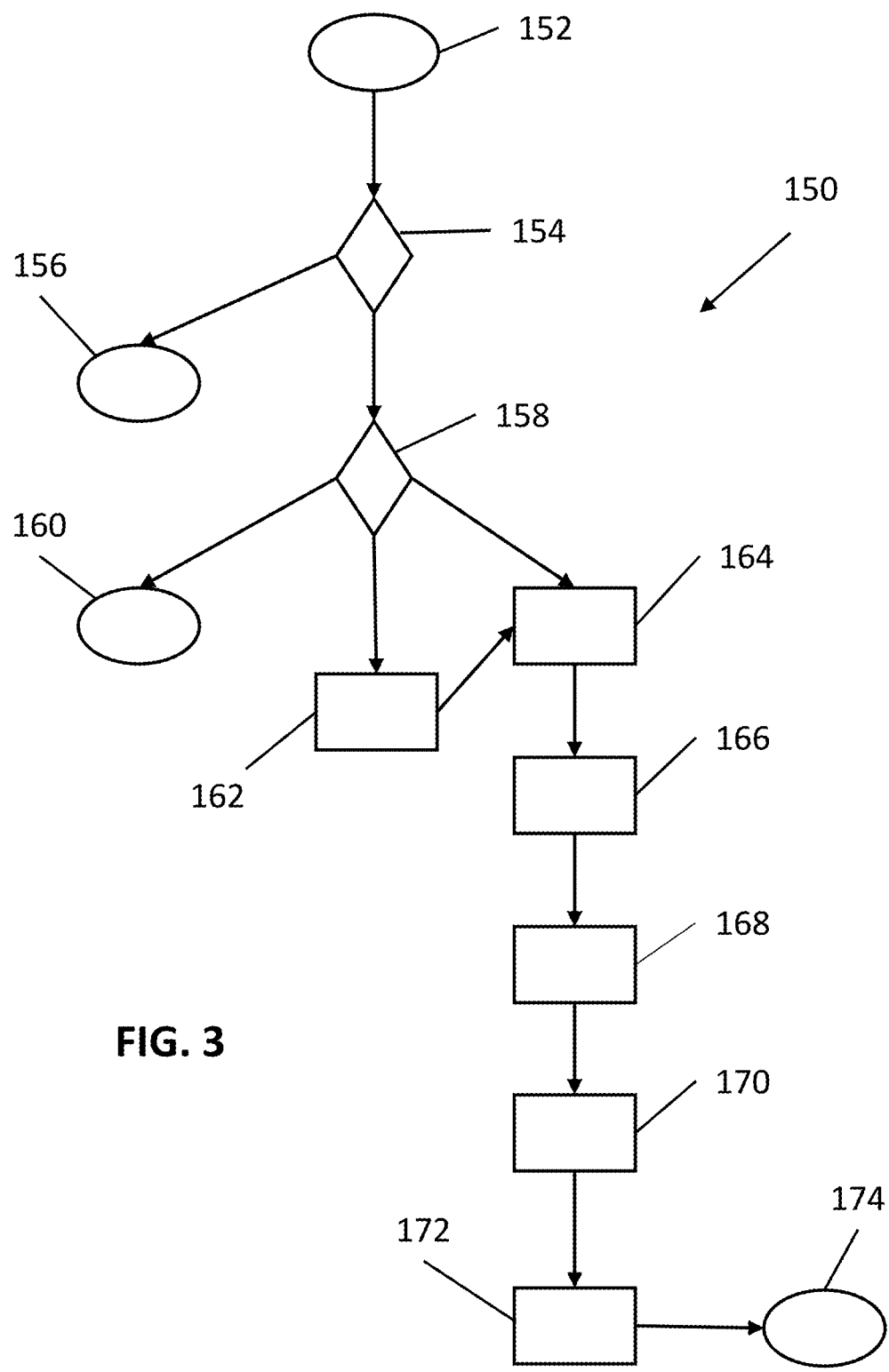
FIG. 3 is a process flow diagram for writing at least one of the make, model, and serial number on a spent cartridge of a pistol that ejected the spent cartridge.

With reference now to FIG. 3, a process flow diagram for writing at least one of the make, model, and serial number on a spent cartridge of the pistol that ejected the spent cartridge is shown, which is generally designated 150. The process starts 152 with first queering at 154 whether the pistol or handgun is equipped with a microprocessor. If no, then the process ends at 156. If yes, then the microprocessor is programmed with at least one of the make, model, and serial number of the pistol, including with one or more of the noted information. Next, the process queries whether the round or ammunition is equipped with a writeable memory, such as an EEPROM, at step 158.

If the ammunition is not equipped with a writeable memory, such as an EEPROM, the process ends at 160. If the ammunition is equipped with the writeable memory, then the process can move to step 164. The process moves to step 162 if the ammunition is not equipped with a writeable memory but can be retrofitted with a writeable memory, as discussed elsewhere herein. The process can then move to step 164.

At step 164, the ammunition can be loaded into the chamber of the pistol. This may first require loading the ammunition into a magazine, loading the magazine into the pistol, and then loading the ammunition into the chamber. As the shell or cartridge moves into the chamber of the pistol, the cartridge contacts the extractor of the pistol, which then, via one-wire protocol, writes information into or onto the writeable memory mounted with the casing at step 166. The information can include at least one of the serial number, make, and the model of the pistol that the ammunition is used with, which will ultimately eject the spent cartridge once the round is fired. At step 168, the pistol can be discharged to fire the round that has a writeable memory mounted therewith, such as an EEPROM, and that received information stored in the microprocessor located with the pistol, such as the serial number, make, and the model of the pistol.

Once the round is fired, the empty shell can be ejected at step 170. The empty shell with the writeable memory can then be collected and information written onto or into, to be considered synonymous terms, the writeable memory can then be read at step 172. Reading data from the chip can involve selecting the target storage, such as by sending a dummy write command to load in the target address. Next, one byte is sent containing the device address and the read/write bit as 1. The EEPROM chip then sends one byte of data in return, which can then be read by a user. Thus, in an example, an empty shell that has been fired by a pistol can be collected and information about the pistol that fired the round with the empty shell can be obtained, such as the make, model, and serial number of the pistol that fired the round. The process then ends at 174 or can repeat beginning at 154, 158, 162, or 164.

Aspects of the invention include an electronic writing system for writing information onto a casing of an ammunition or round, a firearm having the electronic writing system, and a round or ammunition having a writeable memory, such as an EEPROM, mounted onto the casing of the ammunition. Methods of making and of using the electronic writing system and rounds with writeable memories and components thereof are within the scope of the present invention.

Although limited embodiments of an electronic writing system for writing information onto a casing of an ammunition or round and associated devices and components for utilizing the electronic writing system have been specifically described and illustrated herein, many modifications and variations will be apparent to those skilled in the art. Accordingly, it is to be understood that the devices, systems, and assemblies and their components constructed according to principles of the invention may be embodied in other than as specifically described herein. The disclosure is also defined in the following claims.

What is claimed is:

1. A combination pistol and cartridge comprising:
   a Single Wire Output (SWO) capable microprocessor located in the pistol;
   a single wire EEPROM; and
   wherein a single wire interface is provided when a part of the pistol contacts the single wire EEPROM located on the cartridge.

2. The combination firearm and cartridge of claim 1, wherein the part of the pistol that contacts the single wire EEPROM is an extractor.

3. The combination firearm and cartridge of claim 1, wherein the cartridge is electrically grounded via contact with a metal barrel and slide.

4. The combination firearm and cartridge of claim 1, wherein information is written via the single wire interface when the extractor of the pistol contacts the single wire EEPROM.

5. The combination firearm and cartridge of claim 4, wherein the information comprises a serial number of the firearm.

6. A method for manufacturing cartridges comprising:
   placing a substrate containing a single wire EEPROM onto a cartridge.

7. The method of claim 6, further comprising placing a second substrate containing a single wire EEPROM onto a second cartridge.

8. A cartridge comprising:
   a bullet attached to a shell having an interior cavity container gunpowder; and
   a substrate containing a single wire EEPROM mounted to an exterior of the shell.

9. A method of electronically microstamping a shell of a cartridge comprising:
   placing a SWO capable microprocessor in a frame or in a grip of a pistol;
   placing a substrate containing a single wire EEPROM onto the shell of the cartridge;
   forming a single wire interface between the SWO capable microprocessor and the cartridge; and
   communicating information from the SWO capable microprocessor to the single wire EEPROM.

10. The method of claim 9, the information transferred to the EEPROM comprises a serial number of the pistol.

11. The method of claim 10, wherein the information further comprises a make and a model of the pistol.

12. The method of claim 10, further comprising downloading additional data to the EEPROM.

13. The method of claim 12, wherein the additional data comprise at least one of geographical location, time, and date that the cartridge is discharged.

* * * * *